United States Patent
Tichy et al.

(10) Patent No.: US 9,150,176 B2
(45) Date of Patent: Oct. 6, 2015

(54) DEVICE AND METHOD FOR TRIGGERING PASSENGER PROTECTION SYSTEM IN CONSIDERATION OF ROAD GRIP COEFFICIENT

(75) Inventors: Marc Andre Tichy, Tuebingen (DE); Michael Schmid, Kornwestheim (DE); Alfons Doerr, Stuttgart (DE); Holger Denz, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1523 days.

(21) Appl. No.: 12/226,396

(22) PCT Filed: Feb. 20, 2007

(86) PCT No.: PCT/EP2007/051620
§ 371 (c)(1),
(2), (4) Date: Mar. 31, 2009

(87) PCT Pub. No.: WO2007/118725
PCT Pub. Date: Oct. 25, 2007

(65) Prior Publication Data
US 2009/0306859 A1   Dec. 10, 2009

(30) Foreign Application Priority Data
Apr. 19, 2006 (DE) .......................... 10 2006 018 029

(51) Int. Cl.
*B60R 21/0132* (2006.01)
*B60R 21/00* (2006.01)
*B60R 21/013* (2006.01)

(52) U.S. Cl.
CPC ..... *B60R 21/0132* (2013.01); *B60R 2021/0018* (2013.01); *B60R 2021/01304* (2013.01)

(58) Field of Classification Search
CPC ................... B60R 21/0132; B60R 2021/0018; B60R 2021/01304
USPC ................................ 701/45, 46, 47; 180/282; 280/728.1–742, 756
See application file for complete search history.

(56) References Cited

U.S. PATENT DOCUMENTS

| | | | | |
|---|---|---|---|---|
| 5,419,624 A * | 5/1995 | Adler et al. | ................... | 303/112 |
| 5,782,543 A * | 7/1998 | Monzaki et al. | ............... | 303/146 |
| 5,878,357 A * | 3/1999 | Sivashankar et al. | ............. | 701/1 |
| 5,944,392 A * | 8/1999 | Tachihata et al. | ............. | 303/112 |
| 6,065,558 A * | 5/2000 | Wielenga | ...................... | 180/282 |
| 6,081,761 A * | 6/2000 | Harada et al. | ................... | 701/72 |
| 6,170,594 B1 * | 1/2001 | Gilbert | .......................... | 180/282 |
| 6,421,592 B1 * | 7/2002 | Bargman et al. | ................ | 701/45 |

(Continued)

FOREIGN PATENT DOCUMENTS

| | | |
|---|---|---|
| DE | 41 34 831 | 4/1993 |
| DE | 103 03 148 | 7/2004 |

(Continued)

*Primary Examiner* — Paul N Dickson
*Assistant Examiner* — Timothy Wilhelm
(74) *Attorney, Agent, or Firm* — Kenyon & Kenyon LLP

(57) ABSTRACT

A device and a method for triggering passenger protection systems, the passenger protection systems being triggered as a function of a rollover process. A signal which characterizes a road grip coefficient (coefficient of friction) is received via an interface. An evaluation circuit is provided which triggers the passenger protection systems as a function of the signal and a stability factor, the evaluation circuit determining the stability factor as a function of at least one kinematic variable.

15 Claims, 2 Drawing Sheets

(56) References Cited

U.S. PATENT DOCUMENTS

| | | | |
|---|---|---|---|
| 6,662,898 B1 * | 12/2003 | Mattson et al. | 180/446 |
| 6,668,225 B2 * | 12/2003 | Oh et al. | 701/70 |
| 6,671,595 B2 * | 12/2003 | Lu et al. | 701/36 |
| 6,687,575 B2 * | 2/2004 | Mattes et al. | 701/1 |
| 6,799,092 B2 * | 9/2004 | Lu et al. | 701/1 |
| 6,923,050 B2 * | 8/2005 | Levy et al. | 73/146 |
| 6,959,970 B2 * | 11/2005 | Tseng | 303/146 |
| 6,971,726 B2 * | 12/2005 | Levy et al. | 303/150 |
| 7,070,247 B2 * | 7/2006 | Offerle | 303/146 |
| 7,308,350 B2 * | 12/2007 | Brown et al. | 701/70 |
| 7,444,218 B2 * | 10/2008 | Ueno | 701/45 |
| 7,451,033 B2 * | 11/2008 | Xu et al. | 701/70 |
| 7,460,937 B2 * | 12/2008 | Lahmann et al. | 701/45 |
| 7,740,098 B2 * | 6/2010 | Lich et al. | 180/282 |
| 2004/0073346 A1 * | 4/2004 | Roelleke | 701/45 |

FOREIGN PATENT DOCUMENTS

| | | |
|---|---|---|
| DE | 103 03 149 | 7/2004 |
| DE | 698 24 412 | 7/2005 |
| WO | WO 2006/081902 | 8/2006 |

* cited by examiner

SFF = b/a

DEVICE AND METHOD FOR TRIGGERING PASSENGER PROTECTION SYSTEM IN CONSIDERATION OF ROAD GRIP COEFFICIENT

BACKGROUND INFORMATION

German Patent No. DE 103 03 149 describes that, in response to a rollover process, one may activate passenger protection systems as a function of kinematic variables, such as the lateral vehicle acceleration and a rotation rate. German Patent No. DE 698 24 412 T12 describes that one may provide a braking system that is activated as a function of a rollover signal.

SUMMARY OF THE INVENTION

The device according to the present invention and the method of triggering the passenger protection system according to the present invention have the advantage that by using a road grip coefficient that is read in via an interface of the device according to the present invention, it is possible to produce a triggering of the passenger protection system that is more precise and accurate as to time when there is a rollover process underway. In particular, a greater accuracy with regard to the road grip coefficient may be attained via other vehicle systems which very accurately calculate the road grip coefficient, such as a braking system, an engine system or via a wheel sensor system. By predicting or assessing the instantaneous road grip coefficient and the instantaneous stability factor, by comparison with the stability factor, triggering the passenger protection system may then also be undertaken in response to a vehicle rollover. The device has an evaluation circuit for this, which carries out this comparison. The evaluation circuit may be developed, for instance, as a microcontroller. The stability factor is the ratio of the vertical and the horizontal distances of the contact point from the vehicle's center of gravity (FIG. 4). The contact point is the tire. Because of the rollover motion, which is preferably characterized by the rotation rate, the ratio of the vertical and the horizontal distances between the point of contact and the vehicle's center of gravity changes. Since the rest state is known for a standing vehicle, the stability factor may be determined from at least one kinematic variable, such as the rotation rate.

It is particularly advantageous that a triggering circuit is provided which is part of the device, and is used for the selection or the blocking of passenger protection systems as a function of the comparison of the road grip coefficient and the stability factor. For the determination of the stability factor, the roll rate and an additional kinematic variable, such as the deceleration, is used in the longitudinal direction of the vehicle, the transverse direction and/or the vertical direction. For the triggering of the passenger protection system, the sensor system may be inside or outside a control unit. It is possible, in particular, that the device for triggering the passenger protection system is provided to be in its own control unit, or is a part of a further control unit, for instance one that handles active security, such as a control unit for the electronic stability program. The interface according to the present invention is then within the control unit. If there is a control unit for triggering the passenger protection systems, then the outwards interface is, for instance, a bus controller if the road grip coefficient is generated by a control unit for an electronic stability program and is transmitted via a vehicle bus, such as a CAN bus, to the control unit for activating the passenger protection system.

The evaluation circuit is configured particularly for the prediction of the road grip coefficient. In this context, algorithms familiar to one skilled in the art may be used for the prediction. In particular, one may conclude on a future behavior from a present behavior by comparison with stored data. The usual methods of so-called fitting may be used for this.

DETAILED DESCRIPTION

Data from the U.S. shows the importance of passive security in vehicle rollovers. In the year 1998, one-half of all fatal individual vehicle accidents was able to be attributed to a rollover. In the overall accident domain, vehicle rollover occupies a proportion of roughly 20%.

Figure 4:
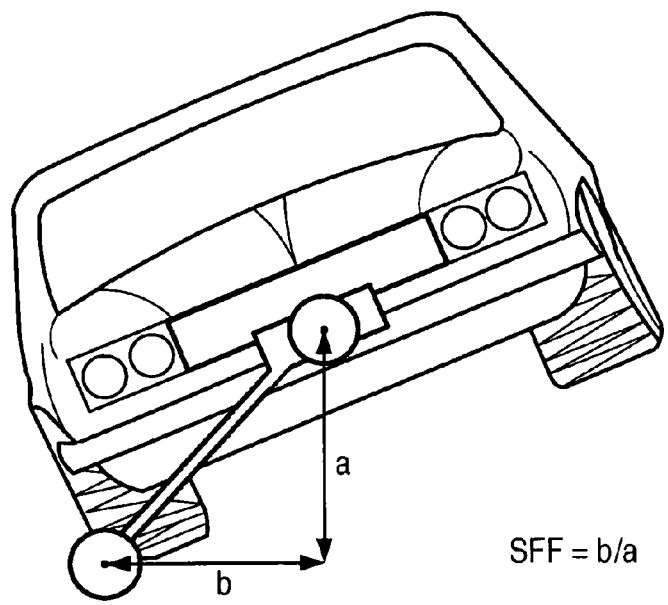
FIG. 4 shows a basic representation.

According to the present invention, the current road grip coefficient is now used as an essential influential variable in rollover dynamics of vehicles in order to activate passenger protection systems in case of a rollover process. The change with time of the roll rate is defined by the following equation:

$$d/d_t \omega_x(t) = \frac{h_{\textit{eff}}}{J}\left(1 - \frac{SSF_{\textit{eff}}}{\mu(t)}\right) \cdot F_y(t)$$

where $\omega_x$ is the current rotation rate of the vehicle about the contact point of the vehicle during the vehicle rollover, $d/dt\omega_x$ is the current change in the rotation rate. $F_y(t)$ is the laterally acting force as a result of the lateral vehicle motion. The instantaneously acting lateral forces or the estimation of the still acting forces, which are measured or predicted by acceleration sensors, are accordingly only a criterion that is important for the prediction of vehicle rollovers. If the current or future road grip coefficient falls below the effective stability factor SSF (static stability factor) of the vehicle, no rollover motion of the vehicle is to be expected. J is the known corresponding moment of inertia of the vehicle and $h_{\textit{eff}}$ is the current height of the center of gravity of the vehicle at the rollover point. The effective SSF of the vehicle is the ratio (SSF=b/a), which continuously changes in response to a rollover process, of the vertical distance (a) and the lateral distance (b) of vehicle center of gravity 41 from the current contact point 40, as explained in FIG. 4. The contact point is the point of rotation of the vehicle. The effective SSF decreases, as a rule, with increasing roll angle. The position of the center of the gravity is determined by the manufacturer using a balance device, and thus this datum is available. In response to an inclination of the vehicle, the changed position of the center of gravity may be estimated at the beginning approximately from the spring characteristics curves, and upon starting of the rollover process over the wheels, from the roll angle and the maximum spring deflection of the wheels. The actual position may be verified by comparison of the currently acting moment of rotation from the rotation rate $\omega_x$ to the currently acting accelerations in the center of gravity from the accelerations $a_y$ and $a_z$: M=F*r. M is proportional to the rotational acceleration, F is proportional to the linear acceleration in the y and z directions, r is the distance from the contact point.

The road grip coefficient µ(t) is determined according to the teaching of German Patent No. DE 41 34 831, for instance. There, the road grip coefficient is designated as the coefficient of friction. The coefficient of friction information is generated as a function of the magnitude of the recorded input torque. However, there are other methods for ascertaining the road grip coefficient. Among these are, for example, the observation of the roadway surface using radar, or other known methods. Because of the explicit use of the road grip coefficient according to the present invention, which, for instance, are provided by other vehicle systems via the interface at clearly great accuracy, the triggering performance of vehicle rollover sensing systems may be improved based on the greater information quality.

The vehicle's effective stability factor SSF (static stability factor) is determined by the evaluation of the current roll motion and the accelerations in the x and/or the y and/or the z direction of the vehicle. It is determined whether a rollover is present by using the following relationship:

$$SSF_{eff}(t) < \mu(t)$$

If the effective SSF exceeds the current road grip coefficient or the one to be currently expected, the activation of appropriate means of restraint and protection systems for the vehicle rollover are restricted and/or blocked as a function of the current rotation rate and/or the angle of rotation.

Figure 1:
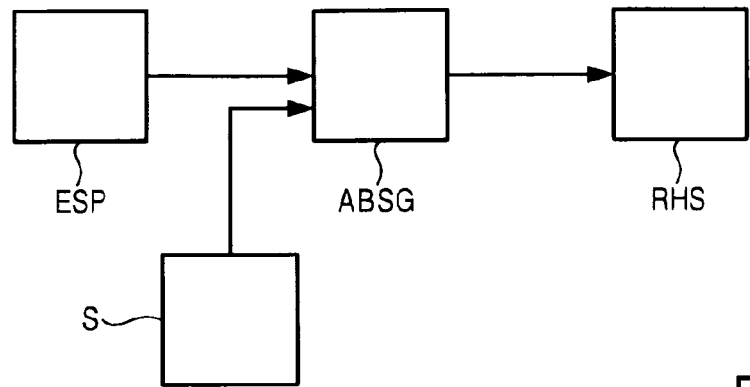
FIG. 1 shows a block diagram of the device according to the present invention.

In a first block diagram, FIG. 1 shows a specific embodiment according to the present invention. An electronic stability program ESP is connected to an air bag control unit ABSG. The control unit for electronic stability program ESP transfers the road grip coefficient, which is determined by this control unit, to air bag control unit ABSG. The connection may be a point-to-point connection, but a bus connection may also be provided, for instance, via the CAN bus. Furthermore, a sensor system S is connected to airbag control unit ABSG, which records kinematic variables in the spatial directions of the vehicle, but also records rotatory motions, such as roll rate $\omega_x$. These sensors may also be positioned within air bag control unit ABSG, or at least they may be partially located in the control unit. Control unit ESP may also include a part of these sensors. As a function of the road grip coefficient and stability factor SSF, which is determined as a function of the variables of sensor system S, air bag control unit ABSG activates passenger protection system RHS, the air bags, roll bars or seat belt tensioners. In the triggering, additional sensor variables, such as those of a passenger sensor system, for instance, force sensors of an environmental sensor system or other crash variables may also be taken into consideration.

Figure 2:
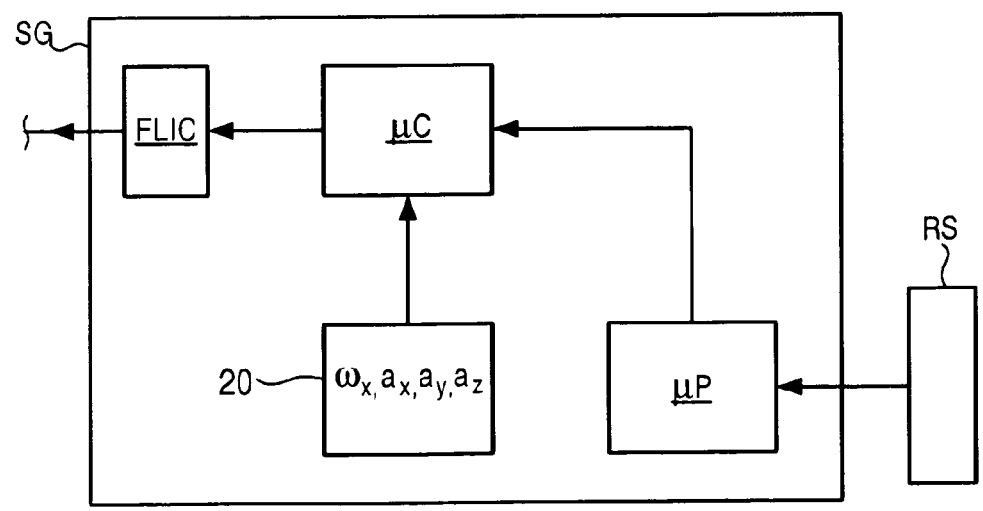
FIG. 2 shows a further block diagram.

FIG. 2 shows an additional block diagram of the device according to the present invention. But now all the important components are placed in one control unit SG. A microcontroller µC is provided in this case as the evaluation circuit. A microcontroller µP supplies the road grip coefficient to microcontroller µC. The road grip coefficient is determined with the aid of data from a wheel sensor system or other data. The road grip coefficient is determined with the aid of data of a radar sensor system, for example, in combination with yaw rates and/or in combination of engine torque data and transmission data. Generally valid vehicle models form the basis for the road grip coefficient determination based on the data recited.

Instead of a microcontroller µC or a microcontroller µP, other types of processors may also be used. Microcontroller µC, as the evaluation circuit, triggers the passenger protection system, namely, via a triggering circuit FLIC, that is, an ignition circuit control. For this control, and via software, that is, a triggering algorithm, microcontroller µC also uses data of a sensor system 20 for the recording of motion variables, such as decelerations in the longitudinal, transverse and/or vertical direction of the vehicle, and roll rate $\omega_x$. As a function of these, microcontroller µC blocks or limits the number and type of the passenger protection systems that are to be triggered, and it does this via control circuit FLIC. The triggering decision may also be determined, in this instance, on the basis of other data, such as the attitude angle and the vehicle's transverse acceleration or the vehicle's transverse speed, or solely on the basis of the rate of rotation $\omega_x$ or the angle of rotation. Parts of the components shown here in FIG. 2 may be located outside control unit SG, or inside.

Figure 3:
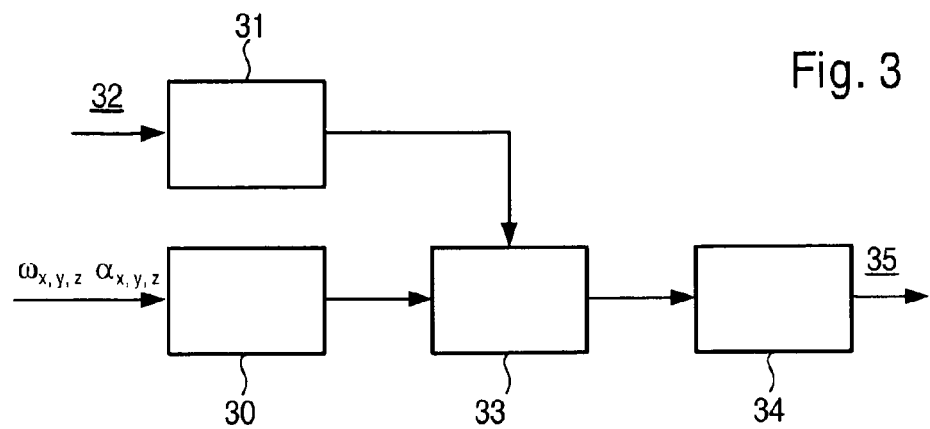
FIG. 3 shows a third block diagram.

FIG. 3 shows the sequence of the inventive method in an additional block diagram. In method step 30, stability factor SSF of the vehicle is determined with the aid of rates of rotation and acceleration, for example, also of rates of rotation about the vehicle's transverse axis or the vehicle's vertical axis. In block 31 data 32 are utilized for determining the road grip coefficient between the wheels and the subsurface. For this purpose, wheel speeds, engine torque and braking force, and other data may be used. From the road grip coefficient and stability factor SSF, comparisons are made in block 33, and also possibly predictions for the future course of a vehicle rollover, or whether the vehicle rollover is able to take place at all. Using this, in block 34 a plausibility check of triggering decisions is performed, or a triggering algorithm or a plurality of algorithms is activated. As a last step, triggering decision 35 is then made.

What is claimed is:

1. A device for triggering a passenger restraint system as a function of a rollover process, comprising:
    an interface via which the device receives a signal that characterizes a road grip coefficient; and
    an evaluation circuit, the evaluation circuit triggering the passenger restraint system as a function of a comparison of the signal and a stability factor, the evaluation circuit determining the stability factor as a function of at least one kinematic variable.

2. The device according to claim 1, further comprising:
    a triggering circuit which undertakes a selection or a blocking of the passenger restraint system, as a function of a trigger signal of the evaluation circuit.

3. The device according to claim 1, further comprising:
    a sensor system for recording kinematic variables, which is connected to the evaluation circuit, the sensor system being configured for recording a roll rate and at least one additional variable.

4. The device according to claim 1, wherein, based on the comparison of the signal and the stability factor, the evaluation circuit undertakes a prediction of variables.

5. The device according to claim 1, wherein the interface is situated in a control unit, and creates a connection to an electronic stability program.

6. The device according to claim 1, wherein the interface includes a bus controller.

7. The device according to claim 1, further comprising:
    a triggering circuit which undertakes a selection or a blocking of the passenger restraint system, as a function of a trigger signal of the evaluation circuit;
    a sensor system for recording kinematic variables, which is connected to the evaluation circuit, the sensor system being configured for recording a roll rate and at least one additional variable;
    wherein, based on the comparison of the signal and the stability factor, the evaluation circuit undertakes a prediction of variables.

8. The device according to claim 7, wherein the interface is situated in a control unit, and creates a connection to an electronic stability program, and wherein the interface includes a bus controller.

9. The device according to claim 1, wherein the interface is situated in a control unit, and creates a connection to an electronic stability program, and wherein the interface includes a bus controller.

10. A method for triggering a passenger restraint system as a function of a rollover process, comprising:
receiving a signal which characterizes a road grip coefficient via an interface;
triggering the passenger restraint system as a function of a comparison of the signal and a stability factor; and
determining the stability factor as a function of at least one kinematic variable.

11. The method according to claim 10, further comprising:
undertaking a selection or a blocking of the passenger restraint system as a function of a trigger signal.

12. The method according to claim 10, further comprising:
predicting variables as a function of the comparison of the signal and the stability factor.

13. The method according to claim 10, wherein a sensor system, which is connected to an evaluation circuit, records the kinematic variables, and wherein the sensor system is configured for recording a roll rate and at least one additional variable, and wherein, based on the comparison of the signal and the stability factor, the evaluation circuit undertakes the prediction of variables.

14. The method according to claim 13, wherein the interface is situated in a control unit, and wherein the interface creates a connection to an electronic stability program, and wherein the interface includes a bus controller.

15. The method according to claim 10, wherein the interface is situated in a control unit, and wherein the interface creates a connection to an electronic stability program, and wherein the interface includes a bus controller.

* * * * *